(12) United States Patent
Barnes

(10) Patent No.: US 10,355,937 B2
(45) Date of Patent: Jul. 16, 2019

(54) SYSTEMS AND METHODS FOR DETERMINING A TOPOLOGY OF A NETWORK COMPRISING A PLURALITY OF INTERMEDIARY DEVICES AND PATHS

(71) Applicant: AOL Inc., Dulles, VA (US)

(72) Inventor: John David Barnes, Chantilly, VA (US)

(73) Assignee: Oath Inc., Dulles, VA (US)

( * ) Notice: Subject to any disclaimer, the term of this patent is extended or adjusted under 35 U.S.C. 154(b) by 675 days.

(21) Appl. No.: 14/642,280

(22) Filed: Mar. 9, 2015

(65) Prior Publication Data
US 2016/0269245 A1 Sep. 15, 2016

(51) Int. Cl.
*H04L 12/24* (2006.01)
*H04L 12/26* (2006.01)
*H04L 12/841* (2013.01)

(52) U.S. Cl.
CPC ............ *H04L 41/12* (2013.01); *H04L 43/10* (2013.01); *H04L 47/286* (2013.01)

(58) Field of Classification Search
CPC ......... H04L 41/12; H04L 45/02; H04L 45/00; H04L 43/10; H04L 45/26
USPC ........................................................ 709/224
See application file for complete search history.

(56) References Cited

U.S. PATENT DOCUMENTS

| | | | |
|---|---|---|---|
| 7,809,806 B1 * | 10/2010 | Rao ..................... | H04L 41/0803 709/220 |
| 7,920,560 B2 * | 4/2011 | Mathiasen .............. | H04L 45/02 370/216 |
| 8,670,326 B1 * | 3/2014 | Balasubramanian ... | H04L 45/22 370/238 |
| 8,989,017 B2 * | 3/2015 | Naouri ..................... | H04L 47/10 370/237 |
| 2008/0232262 A1 * | 9/2008 | Beygelzimer ........... | H04L 41/12 370/252 |
| 2008/0310410 A1 * | 12/2008 | Mathiasen .............. | H04L 45/00 370/389 |
| 2012/0207161 A1 * | 8/2012 | Uppalli ................... | H04L 41/12 370/392 |
| 2015/0003255 A1 * | 1/2015 | Frost ...................... | H04L 45/24 370/238 |
| 2015/0381459 A1 * | 12/2015 | Xiao ................... | H04L 43/0894 370/253 |

* cited by examiner

*Primary Examiner* — William G Trost, IV
*Assistant Examiner* — Imran Moorad
(74) *Attorney, Agent, or Firm* — Bookoff McAndrews, PLLC

(57) ABSTRACT

Systems and methods are disclosed for determining a topology of a network comprising a plurality of intermediary devices and intermediary paths. One method includes transmitting probes having a TTL value with a destination set to a destination device; receiving, for each probe transmitted, a response including an IP address of a responding device; determining whether more than one responding device has responded to the probes; determining whether more than one responding device has been found for two previous transmissions of probes when more than one responding device has responded to the probes; and transmitting, for each more than one responding device, probes having a decreased TTL value with a destination set to one of the IP addresses of the more than one responding devices, when more than one responding device has been found for two previous transmissions.

18 Claims, 5 Drawing Sheets

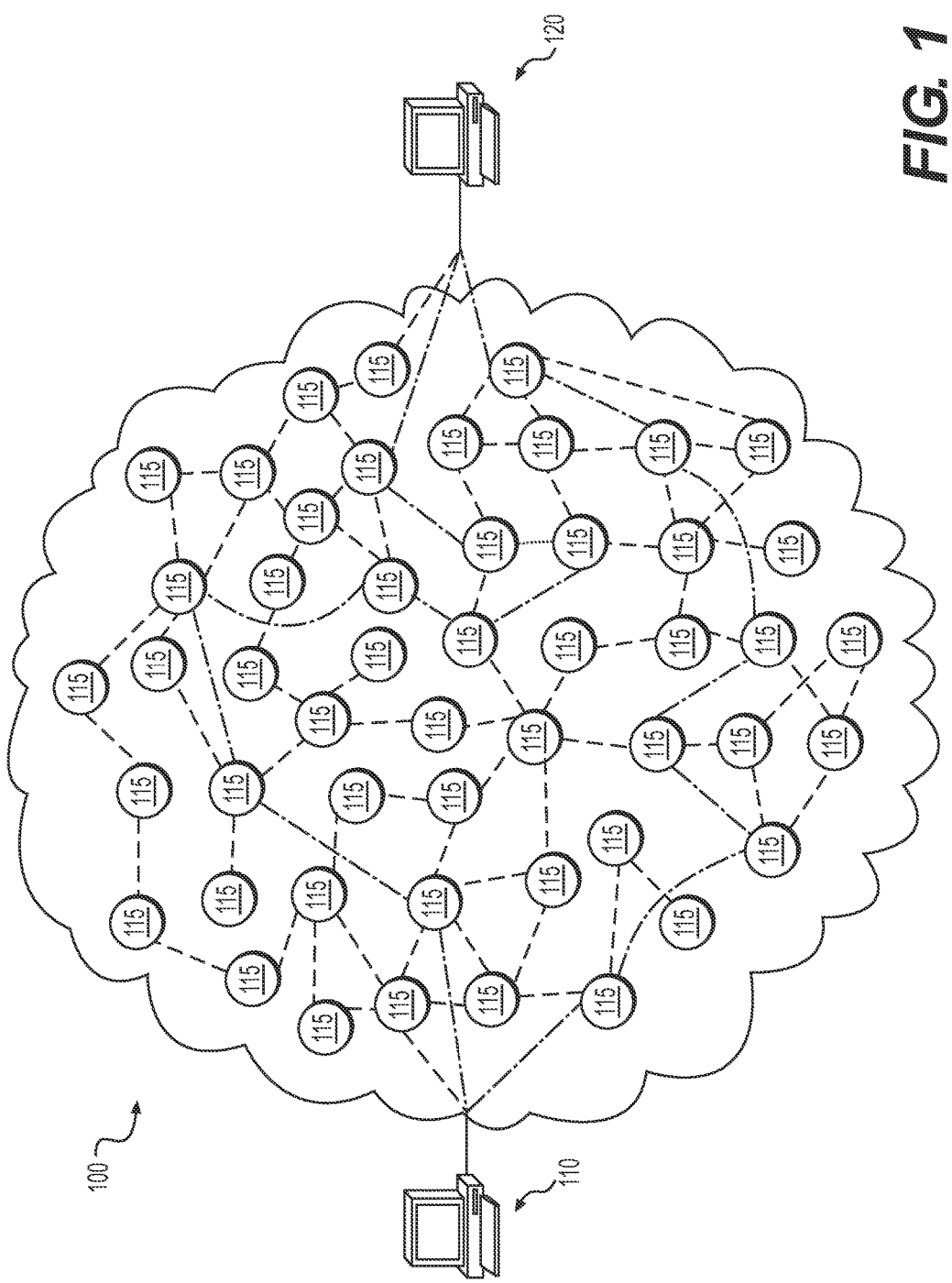

SYSTEMS AND METHODS FOR DETERMINING A TOPOLOGY OF A NETWORK COMPRISING A PLURALITY OF INTERMEDIARY DEVICES AND PATHS

TECHNICAL FIELD

The present disclosure relates generally to the field of computer network management. More particularly, the present disclosure relates to determining the topology of a network having multiple devices and paths.

BACKGROUND

A networked domain may have a number of devices responsible for routing the traffic around the network. These devices may be routers, servers, and other network hardware and software that support layer 2 and layer 3 network layers, which are data link layers of the International Standards Organization's ("ISO") Open System Interconnection ("OSI") standard for networking. Within any given network, there may be multiple routes and redundant back-up routes between the devices to ensure network integrity when one or more devices fail.

As a network grows, devices may be moved, added, removed, or replaced. Thus, the routes between the devices may be moved or altered. As a result, any documentation of the original network design may be outdated. When problems occur, troubleshooting may be difficult without accurate information about the network's topology.

Some devices may include special hardware or functions that allow them to determine their connections. The special hardware or functions may be used to determine the connections at each device, compile the information, and determine the topography of the network. However, each device must include the special hardware or functions to compile the information.

Packet Internet Groper ("PING") is a known function that may send an Internet Control Message Protocol ("ICMP") packet to a specified address of a device and wait for a reply from the device. If a reply is received, then a connection to the addressed device is confirmed. However, PING does not determine each connection to a device. Further, PING is not be able to determine an address for an unknown device.

Traceroute is another known function that may be used to trace out packet routes through Internet connections. Traceroute traces the route that a packet sent from one device takes, shows how many hops the packet takes, and identifies the device at each hop. Traceroute operates by sending packets with a time-to-live ("TTL") field set to a low value. When a packet does not reach its destination because the number of hops exceeds the TTL value, the last host that the packet did reach returns the packet and identifies itself. Traceroute sends a series of packets and increments the TTL of each one. Each failed packet is returned with an identification of the next host. By sending multiple packets, the identity of the device at each hop on the way to the destination may be determined. Traceroute may be used to determine a route between a source device and a destination device, but it does not determine back-up routes, alternative paths, or the topology of the network. It is also dependent on the particular path that a packet takes at the time that the utility is run. Accordingly, the information that may be obtained is very limited.

The present disclosure is directed to overcoming these limitations in order to obtain a better understanding of a network's topology.

SUMMARY OF THE DISCLOSURE

Embodiments of the present disclosure include systems and methods for determining a topology of a network comprising a plurality of intermediary device and intermediary paths.

According to certain embodiments, computer-implemented methods are disclosed for determining a topology of a network comprising a plurality of intermediary devices and intermediary paths. One method includes transmitting, from a source device, at least two probes having a time-to-live ("TTL") value with a destination set to a destination device; receiving, at the source device for each probe transmitted, a response, the response including an Internet protocol ("IP") address of a responding device; determining, by the source device, whether more than one responding device has responded to the at least two probes; determining, by the source device, whether more than one responding device has been found for two previous transmissions of probes when more than one responding device has responded to the at least two probes; and transmitting, from the source device for each more than one responding device, at least two probes having a decreased TTL value with a destination set to one of the IP addresses of the more than one responding devices, when more than one responding device has been found for two previous transmissions.

According to certain embodiments, systems are disclosed for determining a topology of a network comprising a plurality of intermediary devices and intermediary paths. One system includes a data storage device that stores instructions determining a topology of a network comprising a plurality of intermediary device and intermediary paths; and a processor configured to execute the instructions to perform a method including transmitting at least two probes having a time-to-live ("TTL") value with a destination set to a destination device; receiving, for each probe transmitted, a response, the response including an Internet protocol ("IP") address of a responding device; determining whether more than one responding device has responded to the at least two probes; determining whether more than one responding device has been found for two previous transmissions of probes when more than one responding device has responded to the at least two probes; and transmitting, for each more than one responding device, at least two probes having a decreased TTL value with a destination set to one of the IP addresses of the more than one responding devices, when more than one responding device has been found for two previous transmissions.

According to certain embodiments, a non-transitory computer readable medium is disclosed that stores instructions that, when executed by a computer, cause the computer to perform a method for determining a topology of a network comprising a plurality of intermediary devices and intermediary paths. One method includes transmitting, from a source device, at least two probes having a time-to-live ("TTL") value with a destination set to a destination device; receiving, at the source device for each probe transmitted, a response, the response including an Internet protocol ("IP") address of a responding device; determining, by the source device, whether more than one responding device has responded to the at least two probes; determining, by the source device, whether more than one responding device has been found for two previous transmissions of probes when more than one responding device has responded to the at least two probes; and transmitting, from the source device for each more than one responding device, at least two probes having a decreased TTL value with a destination set to one of the IP addresses of the more than one responding devices, when more than one responding device has been found for two previous transmissions.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts a schematic diagram of a computer network in which a network topology may be determined, according to an exemplary embodiment of the present disclosure;

DETAILED DESCRIPTION OF EMBODIMENTS

Figure 2A:
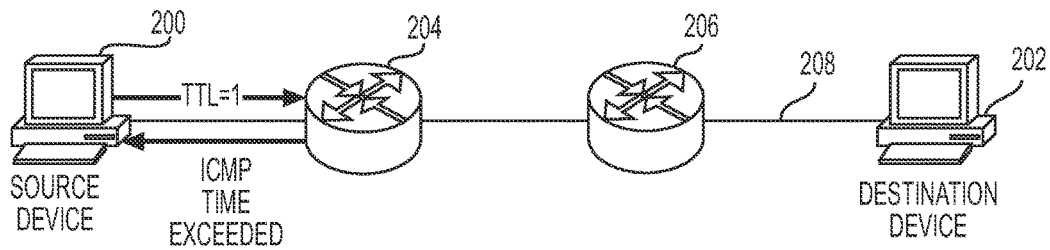
FIGS. 2A-2C depict schematic diagrams illustrating control and data flow between a source device and a destination device on a computer network, according to an exemplary embodiment of the present disclosure.

Embodiments of the present disclosure may be implemented by using probes sent from a source device on a network and then piecing all of the collected information together to determine the overall topology of the network. Probes may be used to sequentially trace the routes that packets of data traverse to reach their destination. By increasing and decreasing the number of hops taken from a source device and changing the destination of the packets, an overall topology of the network may be determined.

Referring now to the figures, FIG. 1 depicts an exemplary model of a network 100 including a plurality of network devices 110, 115, and 120 having one or more network connections between the network devices 110, 115, and 120. Source device 110 may be a source of a packet of data to be transmitted destination device 120. Of course, any of the network devices 110, 115, and 120 may be referred to as a source device, which may be used as an initial source for determining the overall topology of the network, and/or a destination device, which may be used an a initial destination, as will be described in more detail below. While FIG. 1 illustrates device 110 as being the initial source device and device 120 as being the initial destination device of network 100, one will appreciate that the source and destination may occur anywhere with network 100 and are not restricted to any location or device within the network topology.

There may be several different protocols that control data transfer between the network devices, with each protocol fulfilling a particular need. For example, the Transmission Control Protocol ("TCP") may guarantee reliable and in-order delivery of data from a source device to a destination device. The User Datagram Protocol ("UDP") may be used, but does not necessarily provide reliable and in-order delivery of data from a source device to a destination device. The Internet Control Message Protocol ("ICMP") may be used primarily to report error messages through the network. The ICMP may define several types of packets, including the time-to-live exceeded and port unreachable messages that are critical parts of the probe utility. Details of which will be presented in more detail below.

The protocols may also rely on one another. For example, the well-known Hyper Text Transfer Protocol ("HTTP") is built on top of the TCP protocol, which is built on top of the Internet Protocol ("IP"). Given the layered reliance of the aforementioned protocols, they may also be referred to as "layers."

In the context of modeling networks with directed graphs as shown in FIG. 1, the IP layer (layer 3 in the OSI standard), is the layer which may be most commonly modeled as a directed graph. Other OSI layers, for example layer 2, may also be placed in the context of a directed graph, which may include bridges and switches as nodes. Various embodiments of the disclosure presented herein may be widely applicable to any networking layer and are not restricted to the IP layer.

With a layer 3 network, a data path may include a source device and a destination device and a series of intermediate devices. Packets arriving at a device may be queued, and await transmission to the next device according to the packet's protocol as handled by the device. Physically, a queue may include a block of computer memory that temporarily stores the packets. If the queue is full when a packet arrives, it may be discarded. Otherwise, the packet may be held until it reaches the front of the queue and then forwarded to the next device on the way to the destination device. This queuing mechanism may be responsible for observed packet losses and, to a large extent, for packet delays.

Referring back to FIG. 1, the source device 110 and destination device 120 may be wired and/or wireless devices that are capable of transferring data over a data network. Moreover, as mentioned previously, network 100 is greatly simplified for ease of explanation, and one should appreciate that embodiments of the disclosure are applicable to any type of communications network, such as, for example, a global communication network such as the Internet, a wide area network, a metropolitan area network, a local area network, a wireless cellular network, a public switched telephone network ("PSTN"), and/or a satellite network, as well as portions or combinations of these and/or other communication networks.

In one embodiment, the probe utility may be used to determine the topology of the network. For example, a trace may transmit two or more packets (also referred to as probes) from a source device, and then exploit the time-to-live ("TTL") field of a packet to determine the route that the packet takes to the destination device. When an intermediary network device receives an IP packet, the intermediary device may decrement the TTL value and forward the packet toward the destination device, according to the routing table of the intermediary device.

Figure 2B:
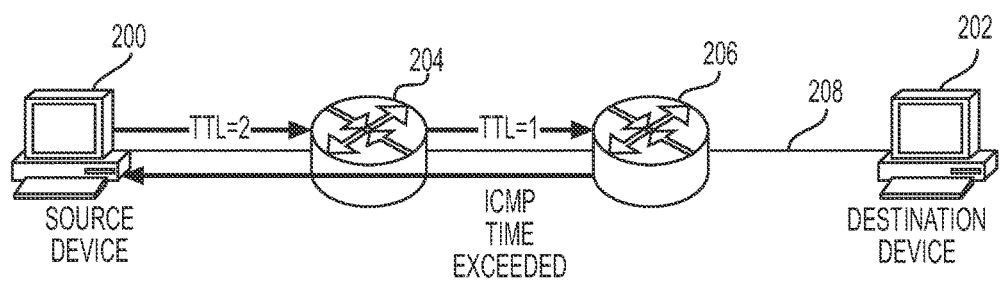
Figure 2C:
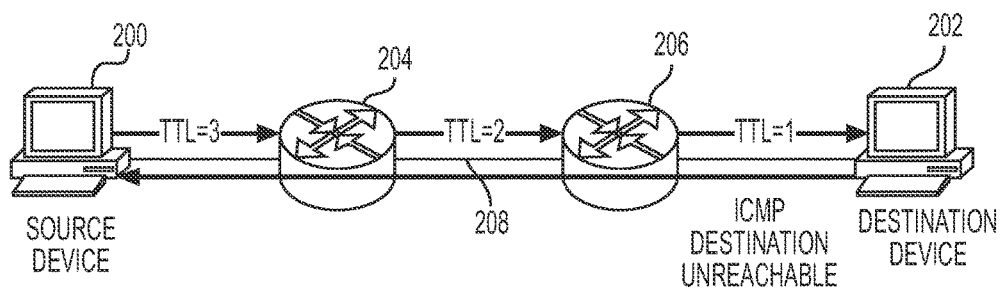

FIGS. 2A-2C depict schematic diagrams, in accordance with example embodiments, illustrating control and data flow between a source device and destination device on a network. As shown in FIG. 2, the system may include a source device 200, a destination device 202, a first intermediary device (e.g., router) 204, and a second intermediary device 206, all connected via a network 208. In the example shown, a trace is initiated from source device 200. A probe may be addressed to a destination device 202 to allow a user or process to discover the network path between the source device 200 and the destination device 202. The probe may include a TTL value of 1. At the first intermediary device 204, the TTL may be decremented by 1 to 0, causing the first intermediary device 204 to transmit an error message. The type of error message sent may be dependent on the method of probe used. In one embodiment, an Internet Control Message Protocol ("ICMP") Time Exceeded message may be transmitted by a device that detects that the TTL has expired. In the example shown in FIG. 2A, source device 200 may transmit a probe with a TTL of 1 to the first intermediary device 204, which transmits an ICMP Time Exceeded message after decrementing the TTL value and determining that the TTL value of the message has expired.

The next step in a trace process is depicted in FIG. 2B, where source device 200 transmits a second probe with an incrementally higher TTL value (e.g., a TTL of 2), which is processed by the first intermediary device 204. The first intermediary device 204 decrements the TTL to 1 and forwards the probe towards the destination device 202. The second intermediary device 206, which in this example is the next hop in the network path from source device 200 to destination device 202, receives the probe and processes the probe. In this situation, the second intermediary device 206 decrements the TTL to 0 and transmits an ICMP error message (e.g., ICMP Time Exceeded message) to the originator of the probe (e.g., source device 200).

FIG. 2C depicts the last step in this example trace process. As described with regard to the previous step illustrated in FIG. 2B, the source device 200, increments the TTL of the probe and transmits probe towards the destination device 202. At the first intermediary device 204, the TTL is decremented and analyzed. Because the TTL is not reduced to 0, the probe is forwarded using network routing processes. In the example shown, the next hop in the network path is the second intermediary device 206. When the probe is received at the second intermediary device 206, the second intermediary device 206 decrements the TTL and analyzes the resulting TTL value. In this case, the TTL is reduced to 1, so the second intermediary device 206 does not transmit an ICMP error message, and forwards the probe to the destination device 202. In an example embodiment, the probe may be addressed to an unknown and/or unused destination UDP port. As such, when the probe reaches the destination device, a different ICMP message may be transmitted in response. In the example illustrated, an ICMP Destination Unreachable with a port unreachable code message may be transmitted in response to the probe.

The source device 200 may use the responsive messages (e.g., ICMP Time Exceeded or ICMP Destination Unreachable messages) to determine network latency times, discover network paths to a destination device, and/or obtain other information, such as data included in a multi-part ICMP message used for troubleshooting network issues. Probe data and processes may also be used in conjunction with other network analysis tools, such as PING, to further expose network information, such as network topology, network structure, device identification, or the like.

As mentioned above, trace process may transmit two or more probes from the source device, per router hop, resulting in two or more latency measurements to each hop. In some instances, the two or more probes may traverse different paths. Within a complex IP network, there may be one or more devices, such as a load balancer, directing traffic across multiple devices between a particular source device and destination device.

Figure 3:
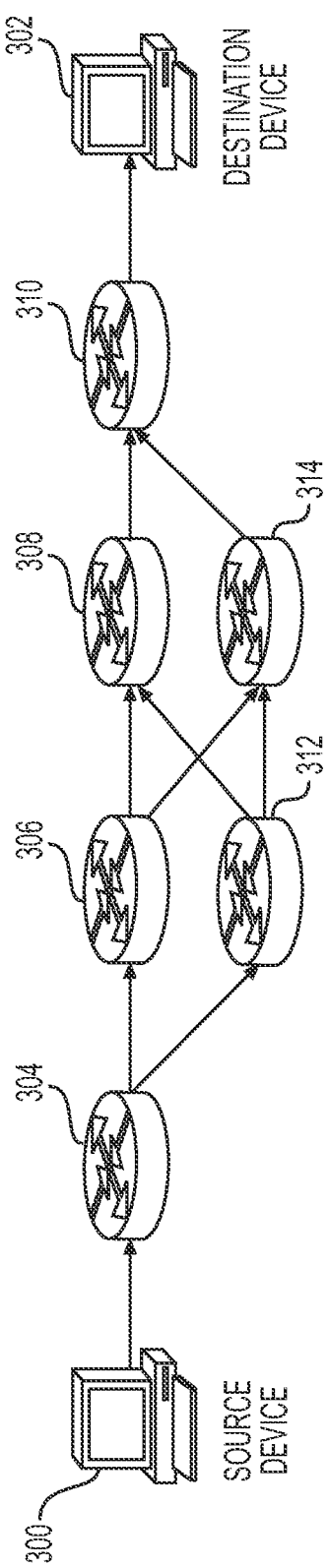
FIG. 3 depicts a schematic diagram illustrating control and data flow between a source device and a destination device on a computer network with multiple paths and intermediary devices, according to an exemplary embodiment of the present disclosure.

As shown in FIG. 3, each of the probes may travel down a different path, depending on how a hashing algorithm is configured on each of the intermediary devices. In this example embodiment, each of the three probes from the source device 300 may travel to the intermediary device 304. After the first hop, two of the probes may travel to intermediary device 306 and the third probe may travel to intermediary device 312. The subsequent probes may travel to the next intermediary devices in the network, such as devices 308 and 314, then to intermediary device 310, and finally, to destination device 302. The results of a probe may appear to be bouncing back and forth between locations, and may be difficult to parse.

Figure 4:
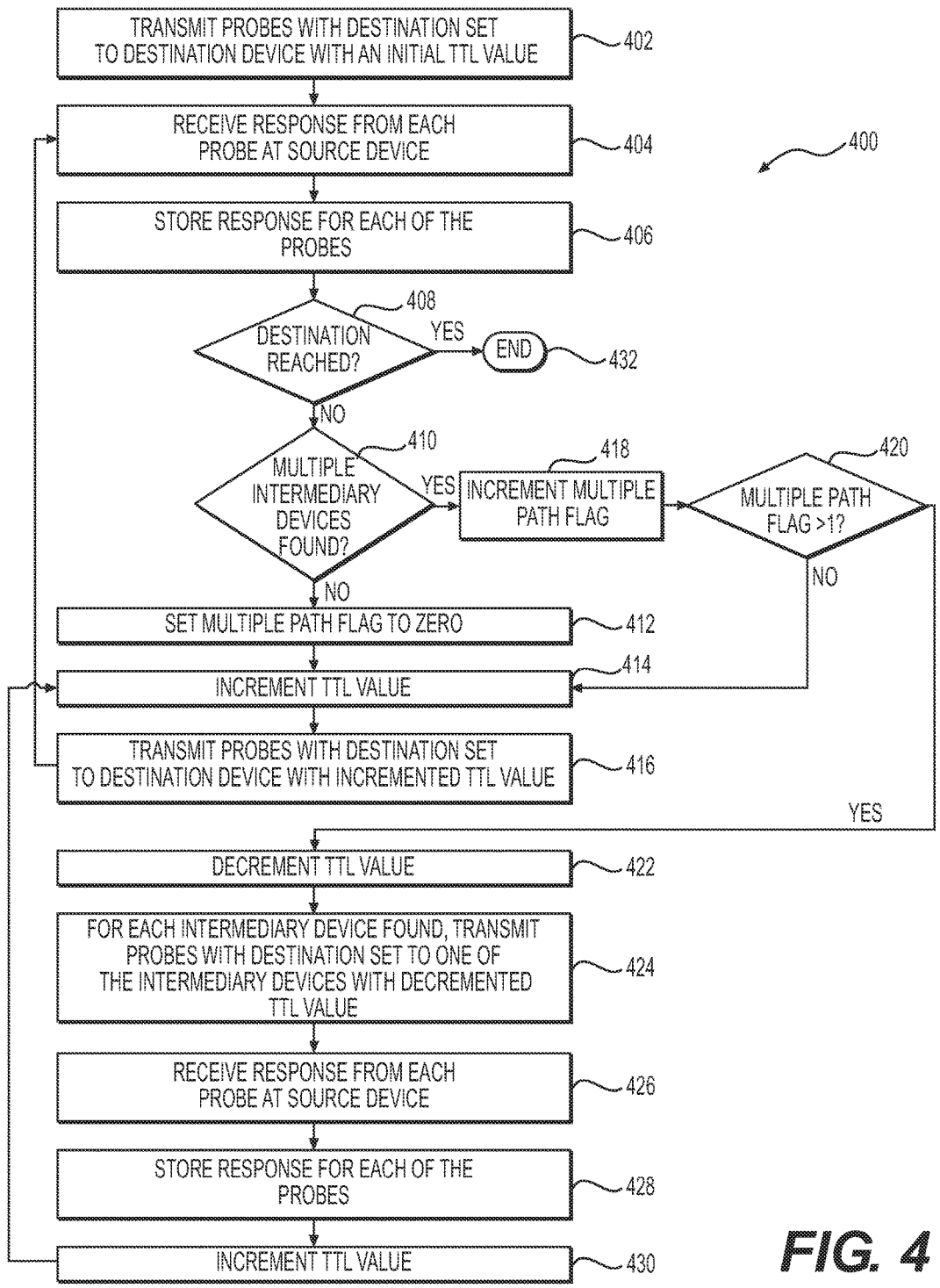
FIG. 4 depicts a flow diagram of an exemplary method for determining a topology of a network comprising a plurality of intermediary device and intermediary paths, according to an exemplary embodiment of the present disclosure.

In order to obtain a more accurate network topography, the method 400, as shown in FIG. 4, may be employed. At step 402, two or more probes may be transmitted from a source device with a destination set to a destination device with an initial TTL value, such as 1. At step 404, the source device may receive a response from each probe transmitted. The response may include an IP address of the device transmitting the response, response times, timeouts, DNS, etc. The source device may then store the response including the TTL value, IP address of the device transmitting the response, response times, timeouts, DNS, etc. at step 406.

At step 408, the source device may determine whether the destination has been reached by any of the two or more probes based on the responses received. The source device may determine whether the destination has been reached based on the messages of the response. For example, an ICMP Time Exceeded message or an ICMP Destination Unreachable with a port unreachable code message may be transmitted in response to the probe. If the message is ICMP Destination Unreachable with a port unreachable code message, then it may be determined that the destination device has been reached.

Alternatively, the source device may determine the destination has been reached by comparing the set destination to the IP address of each response. When the set destination is equal to the IP address of the device transmitting the response, then it may be determined that the destination device has been reached. When the destination has been determined to be reached, the method may proceed to step 432 and end.

If the destination is determined not to have been reached, the source device may determine whether multiple intermediary devices have been found at step 410. For each probe transmitted, the source device may compare the IP addresses of the device transmitting the response to the probe. For example, if the IP addresses of the devices transmitting the responses to the probes are not the same, then multiple intermediary devices have been found.

If multiple intermediate devices have not been found, then the multiple path flag may be cleared, at step 412. For example, the multiple flag may be set to zero. After clearing the multiple path flag, the method may proceed to step 414, in which the TTL value is incremented. The method may then proceed to step 416, where the source device may transmit two or more probes with the destination set to the destination device and with the incremented TTL value. The method 400 may then proceed to step 404.

If multiple intermediary devices have been found, the source device may determine whether multiple intermediary devices have been found for the two previous transmissions of probes. For example, if multiple intermediary devices have been found, then a multiple path flag may be incremented at step 418. For example, the multiple path flag may be incremented from zero to one. The source device at step 420 may then determine whether the multiple path flag is greater than one. If the multiple path flag is not greater than one, then the method will proceed to step 414, in which the TTL value is incremented.

If the multiple path flag is greater than one, then the method will proceed to step 422 in which the TTL value is decremented. Then, at step 424, for each intermediary device found, the source device may transmit probes with a destination set to one of the intermediary devices and with the TTL value being decremented. At step 426, the source device may receive a response from each probe transmitted. The response may include an IP address of the device transmitting the response, response times, timeouts, DNS, etc. The source device may then store the response, including the TTL value, IP address of the device transmitting the response, response times, timeouts, DNS, etc. at step 428. At step 430, the source device may increment the TTL value, and then proceed to step 414, in which the TTL value is again incremented.

The above disclosed method may also be used in network troubleshooting. Additionally, the responses may be obtained from other source devices and stored in a central database. This may allow building of a detailed live map of a network, as well as being able to determine live health statistics for paths and devices.

Figure 5:
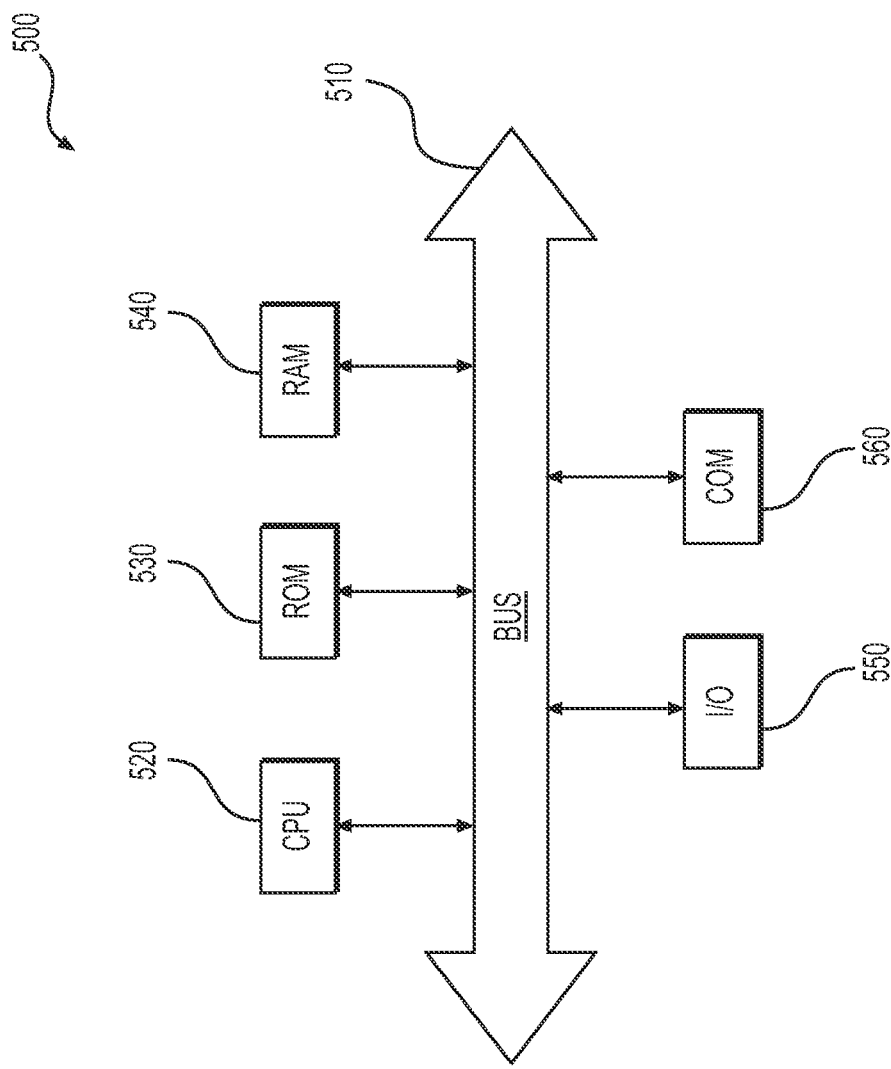
FIG. 5 is a simplified functional block diagram of a computer that may be configured as a device for executing the method of FIG. 4, according to exemplary embodiments of the present disclosure.

FIG. 5 is a simplified functional block diagram of a computer that may be configured as devices, switches, controllers, and/or servers for executing the methods, according to exemplary an embodiment of the present disclosure. Specifically, in one embodiment, any of the devices, switches, controllers, and/or servers may be an assembly of hardware 500 including, for example, a data communication interface 560 for packet data communication. The platform may also include a central processing unit ("CPU") 520, in the form of one or more processors, for executing program instructions. The platform typically includes an internal communication bus 510, program storage, and data storage for various data files to be processed and/or communicated by the platform such as ROM 530 and RAM 540, although the system 500 often receives programming and data via network communications 570. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer-implemented method for determining a topology of a network, the method comprising:
    transmitting, from a source device, a first probe and a second probe, wherein each of the first probe and the second probe includes a first time-to-live ("TTL") value and a destination address set to a destination device;
    in response to each of the transmitted first probe and second probe, receiving, at the source device, at least a first response from at least a first intermediary device, wherein the response includes an Internet protocol ("IP") address of the first intermediary device;
    determining, by the source device, whether a second response has been received from a second intermediary device in response to either of the transmitted first probe or second probe;
    in response to determining that a second intermediary device has responded to either of the first probe or second probe, determining, by the source device, whether either of the first intermediate device or the second intermediate device have responded to two previous transmissions of probes;
    in response to determining that either of the first intermediate device or the second intermediate device has responded to two previous transmissions of probes, transmitting, from the source device, a third probe and a fourth probe, wherein each of the third probe and fourth probe includes a decreased TTL value from the first TTL value and a destination address set to each of the first intermediate device and the second intermediate device; and storing, by the source device, a response received from each of the first intermediate device and the second intermediate device in response to the transmitted third probe and fourth probe, wherein the source device is configured to determine a network topology based on the stored responses received from the first intermediary device and the second intermediary device.

2. The method of claim 1, wherein determining whether a second intermediary device has responded to the first probe and/or second probe includes:

comparing, by the source device, the IP address of the first intermediary device and the second intermediary device for each response received to verify that they are each not the same IP address.

3. The method of claim 1, wherein determining whether each of the first intermediate device or the second intermediate device has responded to two previous transmissions of probes includes:

incrementing, by the source device, a multiple path flag; and determining, by the source device, whether the multiple path flag is greater than one.

4. The method of claim 1, further comprising:

storing, by the source device for each probe transmitted, the response received and the TTL value of the transmitted probe.

5. The method of claim 1, further comprising:

determining, by the source device, whether an IP address of a response is an IP address of the destination device.

6. The method of claim 1, further comprising:

increasing, by the source device, the TTL value of each of the first probe and the second probe when more than one responding device has not responded to each of the first probe and the second probe; and transmitting, from the source device, at least two probes having the increased TTL value with a destination set to a destination device.

7. The method of claim 1, further comprising:

increasing, by the source device, the TTL value each of the first probe and the second probe in response to determining that more than one of either the first intermediary device or the second intermediary device has not responded to the two previous transmissions of probes; and transmitting, from the source device, at least two probes having the increased TTL value with a destination set to a destination device.

8. A system determining a topology of a network comprising a plurality of intermediary devices and intermediary paths, the system including:

a data storage device that stores instructions determining a topology of a network comprising a plurality of intermediary device and intermediary paths; and a processor configured to execute the instructions to perform a method including:

transmitting, from a source device, a first probe and a second probe, wherein each of the first probe and the second probe includes a first time-to-live ("TTL") value and a destination address set to a destination device;

receiving, for each probe transmitted, at least a first response from at least a first intermediary device, wherein the response includes an Internet protocol ("IP") address of the first intermediary device;

determining whether a second response has been received from a second intermediary device in response to either of the transmitted first probe or second probe;

determining that either of the first intermediate device or the second intermediate device has responded to two previous transmissions of probes; and transmitting, a third probe and a fourth probe, wherein each of the third probe and fourth probe includes a decreased TTL value from the first TTL value and a destination address set to each of the first intermediate device and the second intermediate device; and storing, by the source device, a response received from each of the first intermediate device and the second intermediate device in response to the transmitted third probe and fourth probe, wherein the source device is configured to determine a network topology based on the stored responses received from the first intermediary device and the second intermediary device.

9. The system of claim 8, wherein determining whether a second intermediary device has responded to the first probe and/or second probe includes:

comparing, by the source device, the IP address of the first intermediary device and the second intermediary device for each response received to verify that they are each not the same IP address.

10. The system of claim 8, wherein determining whether each of the first intermediate device or the second intermediate device has responded to two previous transmissions of probes includes:

incrementing, by the source device, a multiple path flag; and determining, by the source device, whether the multiple path flag is greater than one.

11. The system of claim 8, wherein the processor is further configured to execute the instructions to perform the method including:

storing, by the source device for each probe transmitted, the response received and the TTL value of the transmitted probe.

12. The system of claim 8, wherein the processor is further configured to execute the instructions to perform the method including:

determining, by the source device, whether an IP address of a response is an IP address of the destination device.

13. The system of claim 8, wherein the processor is further configured to execute the instructions to perform the method including:

increasing, by the source device, the TTL value of each of the first probe and the second probe when more than one responding device has not responded to each of the first probe and the second probe; and transmitting, from the source device, at least two probes having the increased TTL value with a destination set to a destination device; and transmitting, from the source device, at least two probes having the increased TTL value with a destination set to a destination device.

14. The system of claim 8, wherein the processor is further configured to execute the instructions to perform the method including:

increasing, by the source device, the TTL value each of the first probe and the second probe in response to determining that more than one of either the first intermediary device or the second intermediary device has not responded to the two previous transmissions of probes; and transmitting, from the source device, at least two probes having the increased TTL value with a destination set to a destination device.

15. A non-transitory computer-readable medium storing instructions that, when executed by a computer, cause the computer to perform a method for determining a topology of a network comprising a plurality of intermediary devices and intermediary paths, the method including:

transmitting, from a source device, a first probe and a second probe, wherein each of the first probe and the second probe includes a first time-to-live ("TTL") value and a destination address set to a destination device;

in response to each of the transmitted first probe and second probe, receiving, at the source device, at least a first response from at least a first intermediary device, wherein the response includes an Internet protocol ("IP") address of the first intermediary device;

determining, by the source device, whether a second response has been received from a second intermediary device in response to either of the transmitted first probe or second probe;

in response to determining that a second intermediary device has responded to either of the first probe or second probe, determining, by the source device, whether either of the first intermediate device or the second intermediate device have responded to two previous transmissions of probes;

in response to determining that either of the first intermediate device or the second intermediate device has responded to two previous transmissions of probes, transmitting, from the source device, a third probe and a fourth probe, wherein each of the third probe and fourth probe includes a decreased TTL value from the first TTL value and a destination address set to each of the first intermediate device and the second intermediate device; and storing, by the source device, a response received from each of the first intermediate device and the second intermediate device in response to the transmitted third probe and fourth probe, wherein the source device is configured to determine a network topology based on the stored responses received from the first intermediary device and the second intermediate device.

16. The computer-readable medium of claim 15, wherein determining whether a second intermediary device has responded to the first probe and/or second probe includes:

comparing, by the source device, the IP address of the first intermediary device and the second intermediary device for each response received to verify that they are each not the same IP address.

17. The computer-readable medium of claim 15, wherein determining whether each of the first intermediate device or the second intermediate device has responded to two previous transmissions of probes includes:

incrementing, by the source device, a multiple path flag; and determining, by the source device, whether the multiple path flag is greater than one.

18. The computer-readable medium of claim 15, further comprising:

storing, by the source device for each probe transmitted, the response received and the TTL value of the transmitted probe.

* * * * *